J. D. SHOOTS.
WOOD-BORING MACHINE.

No. 192,793.  Patented July 3, 1877.

WITNESSES
Henry N. Miller
Frank Galt

INVENTOR
James D. Shoots.
Alexander Mason
ATTORNEYS

UNITED STATES PATENT OFFICE.

JAMES D. SHOOTS, OF HORSEHEADS, ASSIGNOR OF ONE-HALF HIS RIGHT TO STODDARD H. CONKLING, OF SAME PLACE, AND CHARLES E. VINTON, OF ELMIRA, NEW YORK.

IMPROVEMENT IN WOOD-BORING MACHINES.

Specification forming part of Letters Patent No. 192,793, dated July 3, 1877; application filed June 20, 1877.

*To all whom it may concern:*

Be it known that I, JAMES D. SHOOTS, of Horseheads, in the county of Chemung, and in the State of New York, have invented certain new and useful Improvements in Boring-Machines; and do hereby declare that the following is a full, clear, and exact description thereof, reference being had to the accompanying drawings, and to the letters of reference marked thereon, making a part of this specification.

The nature of my invention consists in the construction and arrangement of a machine for boring and reaming logs for pump-stocks or other purposes, as will be hereinafter more fully set forth.

In order to enable others skilled in the art to which my invention appertains to make and use the same, I will now proceed to describe its construction and operation, referring to the annexed drawing, in which—

Figure 1:
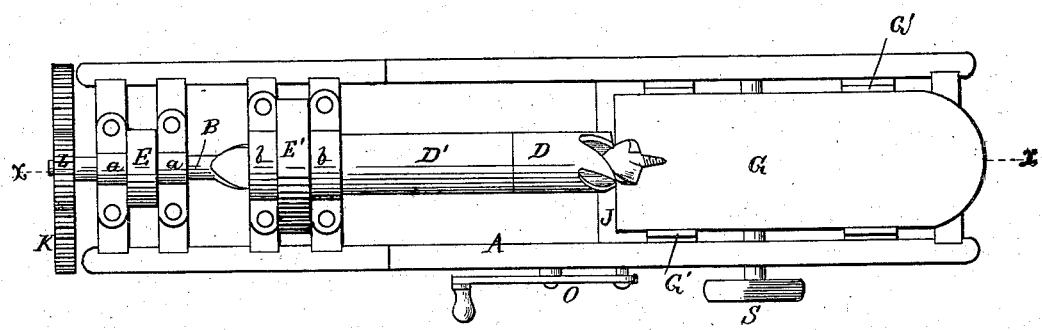
Figure 2:
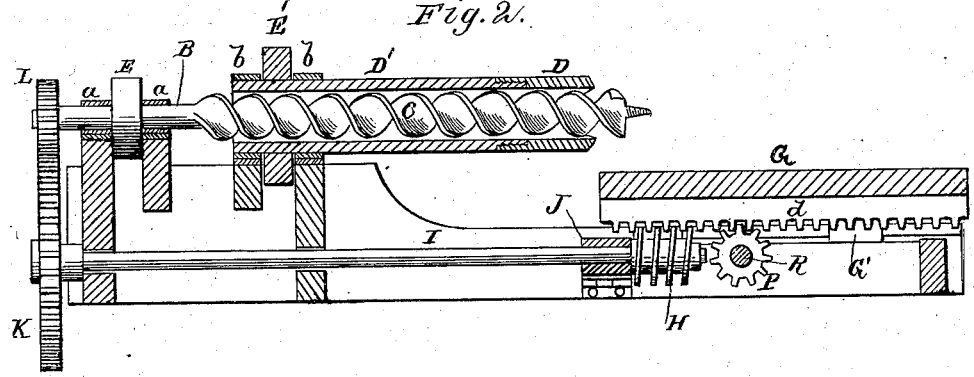

Figure 1 is a plan view of my machine. Fig. 2 is a longitudinal vertical section of the same through the line $x\ x$, Fig. 1.

A represents the frame-work, constructed in any suitable manner, to receive the various working parts of the machine.

In suitable boxes $a\ a$ on this frame is placed the shank B of the auger C, said shank being between said boxes or bearings, provided with a driving-pulley, E, as shown.

In other bearings, $b\ b$, on the frame is placed the reamer, which surrounds the auger, as shown, and which is intended to ream out the log. This reamer is made in two parts, D and D', the part D' being simply a tube of cast-iron or other suitable metal, while the part D is made of steel, and forms the reamer proper. The part D is united to the part D' by screw-threads, as shown in Fig. 2, and the joint so made that the outer surface of the reamer will be perfectly smooth and even. The auger C projects a suitable distance beyond the end of the reamer, and both are rotated in the same direction.

The reamer is provided with a driving-pulley, E', of twice the size of the pulley E for the auger, so that, as they are both run by belts from the same shaft, the auger will be rotated twice as fast as the reamer, or about in that proportion, otherwise the auger would soon become clogged or choked; but by running the auger so much faster than the reamer, the auger is enabled to carry off all the chips as fast as cut by both the auger and reamer, it being readily seen that they must all pass through the reamer to the rear end thereof, where they are discharged by the auger.

G represents the table upon which the log is laid to be bored. This table is provided with suitable legs G', having feet on their lower ends, which ride in suitable guides or ways in the frame A. To the under side of the table G is secured a rack-bar, $d$, which takes into a worm, H, on a shaft, I, below the table and tools. This shaft extends to the rear end of the machine, and has a large cog-wheel, K, secured on its end, and this cog-wheel meshes with a smaller cog-wheel, L, secured on the end of the auger-shaft B, as shown, whereby the necessary feed-motion is obtained, the speed of such feed being regulated by the size of the wheels K and L.

It will, of course, be understood that band-wheels may be used instead of these cog-wheels, if so desired.

The outer end of the feed-shaft has a stationary bearing, while the inner end has its bearing in a hinged bar, J, which may be raised and lowered, as required, to throw the worm H in and out of gear with the rack-bar $d$. This hinged bar J is operated by means of a lever, O, which may be held in either position by a notched plate, or by any other suitable or convenient means.

For running the table back a shaft, R, with pinion P, is provided, said pinion meshing with the rack-bar $d$, and one end of the shaft provided with a hand-wheel, S.

The reamer D is formed with curved teeth, which are so turned and beveled as to throw the chips cut by them inward into the reamer, to be carried out by the auger, as above stated.

The steel part D of the reamer may be made a trifle larger than the tube D′, to prevent binding as it passes into the log.

I am aware of a patent to Wyckoff & Morrison, No. 13,606, and disclaim the construction therein shown and described.

Having thus fully described my invention, what I claim as new, and desire to secure by Letters Patent, is—

1. In a machine for boring logs, an auger, C, for boring the hole, and a reamer, D D′, for reaming or completing the same, when the auger projects beyond the reamer, and the two parts revolve in the same direction at different rates of speed, substantially as and for the purposes herein set forth.

2. The combination, with the table G, provided with rack-bar d, of the feed-shaft I, run from the auger-shaft, the worm H, secured on said shaft, and the hinged bar J, with lever O, for throwing the worm in and out of gear, substantially as and for the purposes herein set forth.

In testimony that I claim the foregoing I have hereunto set my hand this 19th day of June, 1877.

JAMES D. SHOOTS.

Witnesses:
FRANK GALT,
J. M. MASON.